C. H. JACOBSEN AND C. BREER.
POWER TRANSMITTING JOINT.
APPLICATION FILED JULY 21, 1920.
1,378,118.
Patented May 17, 1921.
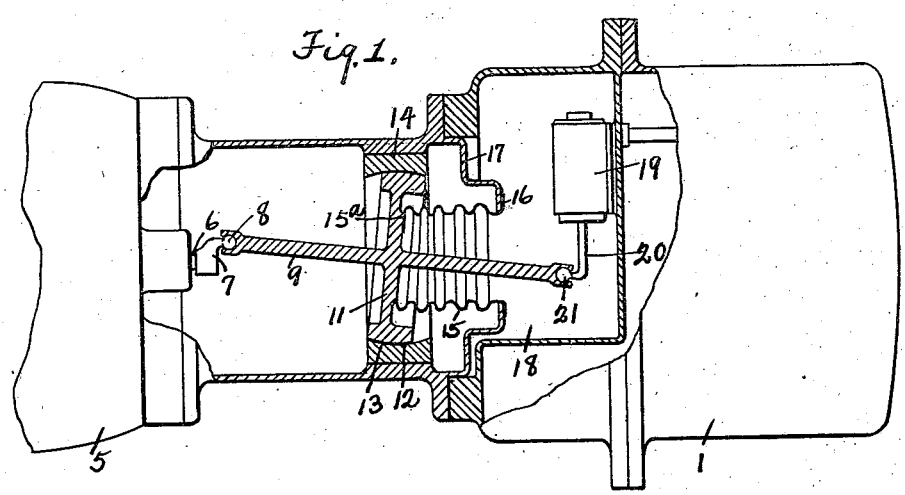
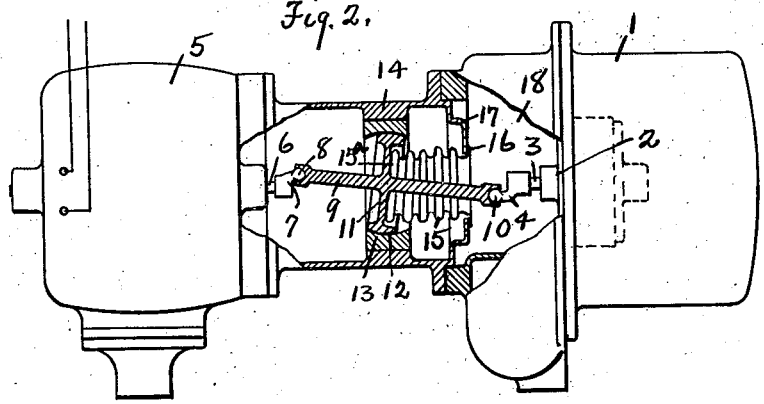
INVENTORS
Charles H. Jacobsen
Carl Breer
By N. C. Lind  Attorney

UNITED STATES PATENT OFFICE.

CHARLES H. JACOBSEN AND CARL BREER, OF DETROIT, MICHIGAN.

POWER-TRANSMITTING JOINT.

1,378,118.  Specification of Letters Patent.  Patented May 17, 1921.

Application filed July 21, 1920. Serial No. 397,838.

*To all whom it may concern:*

Be it known that we, CHARLES H. JACOBSEN and CARL BREER, citizens of the United States, and residing at Detroit, in the county of Wayne and State of Michigan, have invented new and useful Improvements in Power-Transmitting Joints, of which the following is a specification.

The device forming the subject matter of this invention is designed to transmit motion from a motor to a device such as a gas pump through a joint that is perfectly sealed and which will remain perfectly sealed for an indefinite period. It is particularly useful with relation to gas pumps or compressors used in domestic ice machines although we do not wish to be limited to this particular application of the joint in its broader aspects.

The invention is illustrated in the accompanying drawings as follows:—

Figure 1 shows a side elevation, partly in section, of the invention applied to a reciprocating pump.

Fig. 2 a similar view of the invention as applied to a rotary pump.

In the construction shown in Fig. 2, 1 marks the compression chamber, 2 a rotary pump, 3 the drive shaft for the pump, 4 a crank on the drive shaft, 5 a motor, 6 the shaft of the motor, and 7 a crank mounted on the motor shaft. The crank 7 has a ball 8 formed thereon and a wabbling bar 9 forms a ball joint with the ball 8 and a similar ball joint with a ball 10 on the crank 4. A wabbling joint fulcrum 11 has a spherical surface 12 which operates in the spherical bearings 13 in a wall or partition 14. It will readily be seen that as the motor rotates an orbital movement is given to the motor end of the bar 9 and a similar orbital movement given to the opposite end, thus rotating the crank 4 and operating the pump 2. The bar operates on the wabbling fulcrum 11 in transmitting this movement.

The pump as shown is designed for a domestic ice machine and it is essential to the success of these machines that the leakage of gases from them be prevented. On the other hand such machines run for long periods with little or no attention and consequently the joint through which the power of the pump is transmitted is one of vital importance. In the present structure to obviate the leakage from the intake chamber 18 of the pump through the joint through which power is delivered we utilize a bellows diaphragm 15. One end 15ª of the diaphragm is mounted on the fulcrum 11 and the opposite end is secured to the wall 14, as shown the wall having a lip 17 and the diaphragm a flange 16 which extends over the lip. Bellows diaphragms of this type have been used for various purposes and will last for long periods even though subjected to action such as is indicated in this structure.

In Fig. 1 the parts are exactly the same and operate in the same manner except that the pump 19 is of the reciprocating type provided with the connecting rod 20. The end of the bar 9 engages a ball 21 on the end of the connecting rod 20. Obviously an orbital movement given to the end of the bar will give to the connecting rod 20 the necessary oscillating movement to actuate the pump.

What is claimed as new is:—

1. In a power transmitting joint for gas compressors, the combination of a pump; a motor; a driving connection between the motor and the pump comprising a joint; a diaphragm sealing the joint; and a movable member extending from the motor through the diaphragm to the pump for conveying the movement of the motor to the pump.

2. In a power transmitting joint for gas compressors, the combination of a pump; a motor; a driving connection between the motor and the pump comprising a joint; a bellows diaphragm sealing the joint; and a movable member extending from the motor through the diaphragm to the pump for conveying the movement of the motor to the pump.

3. In a power transmitting joint for gas compressors, the combination of a pump; a motor; a driving connection between the motor and the pump comprising a wall between the motor and pump; a wabbling fulcrum mounted in the wall; a crank on the motor; a crank on the pump; a wabbling bar mounted on the fulcrum and extending from one crank to the other; and a bellows diaphragm having one end secured to the fulcrum and the other to the wall to seal the joint at the fulcrum.

4. In a power transmitting joint for gas compressors, the combination of a rotary pump; a motor; a driving connection between the motor and the pump comprising a wall between the motor and pump, a wabbling fulcrum mounted in the wall; a crank on the motor; a crank on the pump; a wabbling bar mounted on the fulcrum and extending from one crank to the other; and a bellows diaphragm having one end secured to the fulcrum and the other to the wall to seal the joint at the fulcrum.

5. A power transmitting joint comprising a wall; a wabbling fulcrum mounted in the wall; a wabbling bar mounted on the fulcrum for transmitting power; and a bellows diaphragm having one end secured to the fulcrum and the other to the bar and sealing the joint at the fulcrum.

In testimony whereof we have hereunto set our hands.

CHAS. H. JACOBSEN,
CARL BREER.